(12) United States Patent
Buchty et al.

(10) Patent No.: US 7,577,819 B2
(45) Date of Patent: *Aug. 18, 2009

(54) VECTOR INDEXED MEMORY UNIT AND METHOD

(75) Inventors: Rainer Buchty, Neuershausen (DE); Nevin Heintze, Morristown, NJ (US); Dino P. Oliva, Maplewood, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/973,078

(22) Filed: Oct. 5, 2007

(65) Prior Publication Data

US 2008/0104364 A1 May 1, 2008

Related U.S. Application Data

(63) Continuation of application No. 10/722,100, filed on Nov. 25, 2003, now Pat. No. 7,299,338.

(60) Provisional application No. 60/430,749, filed on Dec. 4, 2002.

(51) Int. Cl.
*G06F 12/00* (2006.01)
*G06F 13/00* (2006.01)
*G06F 13/28* (2006.01)

(52) U.S. Cl. .................................... 711/220; 711/221

(58) Field of Classification Search .............. 711/220, 711/221
See application file for complete search history.

(56) References Cited

U.S. PATENT DOCUMENTS

| | | | | |
|---|---|---|---|---|
| 4,910,667 | A | * | 3/1990 | Tanaka et al. ............... 711/168 |
| 5,649,142 | A | * | 7/1997 | Lavelle et al. ............... 711/209 |
| 6,745,315 | B2 | * | 6/2004 | Gurney et al. ............... 711/217 |

* cited by examiner

*Primary Examiner*—Sheng-Jen Tsai (57) ABSTRACT

Disclosed is a vector indexed memory unit and method of operation. In one embodiment a plurality of values are stored in segments of a vector index register. Individual ones of the values are provided to an associated operator (e.g., adder or bit replacement). Individual ones of the operators operates on its associated vector index value and a base value to generate a memory address. These memory addresses are then concurrently accessed in one or more memory units. If the data in the memory units are organized as data tables, the apparatus allows for multiple concurrent table lookups. In an alternate embodiment, in addition to the above described operators generating multiple memory addresses, an adder is provided to add the base value to the value represented by the concatenation of the bits in the vector index register to generate a single memory address. Multiplexers controlled by a programmable mode select signal are used to provide either the multiple memory addresses or the single memory address to the memory units. This alternate embodiment provides an apparatus that can programmably function in either an vector indexed memory mode or a conventional memory addressing mode.

16 Claims, 6 Drawing Sheets

VECTOR INDEXED MEMORY UNIT AND METHOD

This application is a continuation of prior Application No. 10/722,100 filed Nov. 25, 2003, now U.S. Pat. No. 7,299,338 which claims the benefit of U.S. Provisional Application No. 60/430,749, filed on Dec. 4, 2002, both of which are incorporated herein by reference.

BACKGROUND OF THE INVENTION

This invention relates generally to memory units and more particularly to techniques for accessing memory addresses within such memory units.

The use of electronic memory units is prevalent in many different types of devices. For example, memory is used in general purpose computers where programs and user data are stored in the memory and accessed as necessary by the computer processor. Although general purpose computers may be the most commonly thought of device which uses such memory, many other devices use electronic memory for storing data. For example, mobile telephones, household electronics and handheld entertainment units are just a few of the devices that utilize electronic memory to store data.

Figure 1:
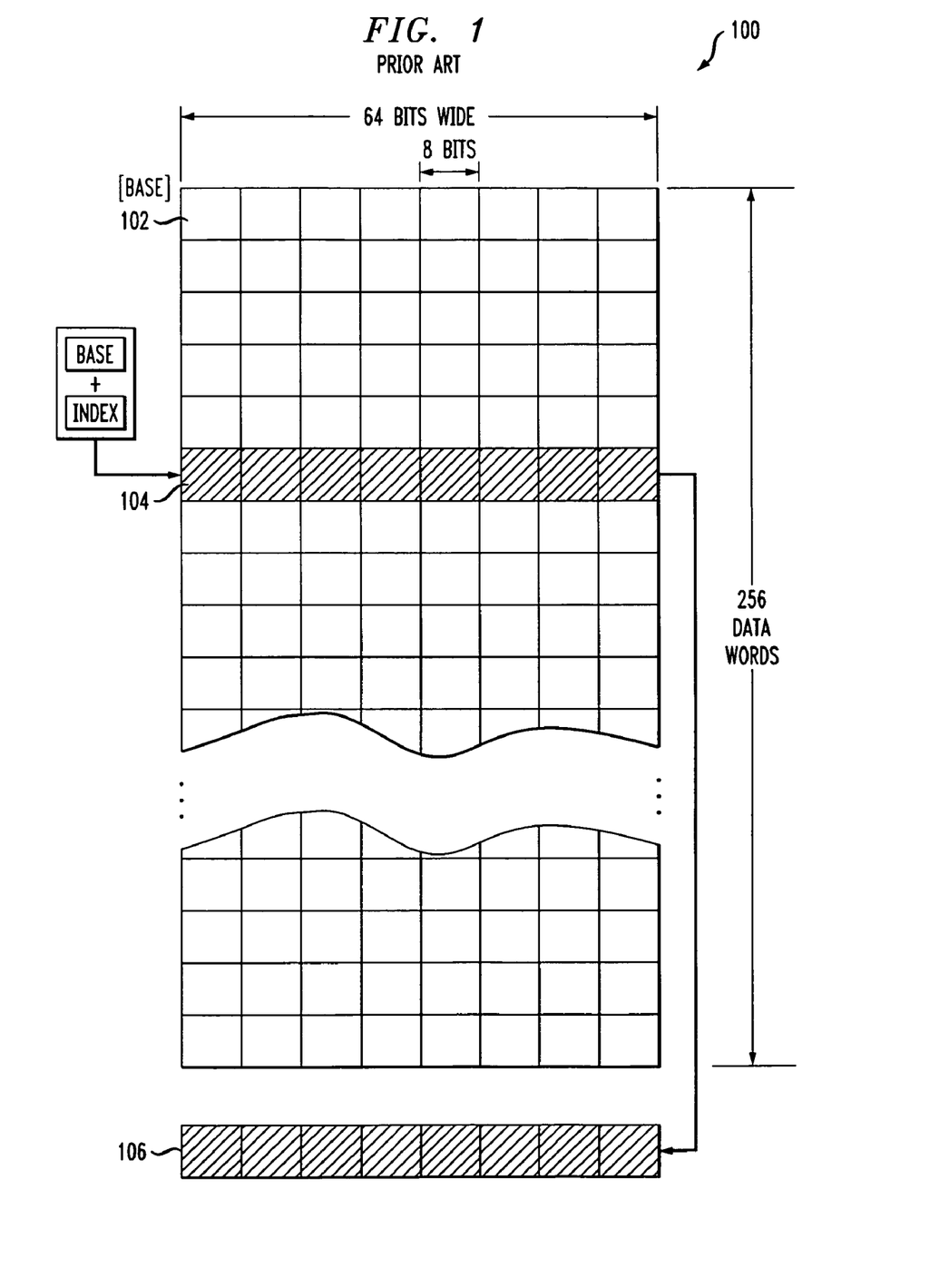
FIG. 1 illustrates the prior art base plus index memory addressing.

As is well known in the art, traditional memory is accessed by providing a memory address to the memory unit and either reading data from or writing data to the particular memory address. One traditional type of memory addressing is base-index addressing in which memory is accessed using a base address b and an index value x. The index x is added to the base address b to calculate the memory address a to be accessed. Such conventional memory addressing is shown in FIG. 1 which illustrates a logical memory 100 which is 64 bits (8 bytes) wide and has capacity to store 256 64-bit data words. Assume for the present illustration that the base value points to the first memory location 102 of logical memory 100. By adding the index value to the base value, the index value acts as an offset and identifies the memory location 104 which has an address of a=b+x. In accordance with conventional memory addressing techniques, the hardware will return the 64 bit data word starting at location 104 to a memory register 106.

Figure 2:
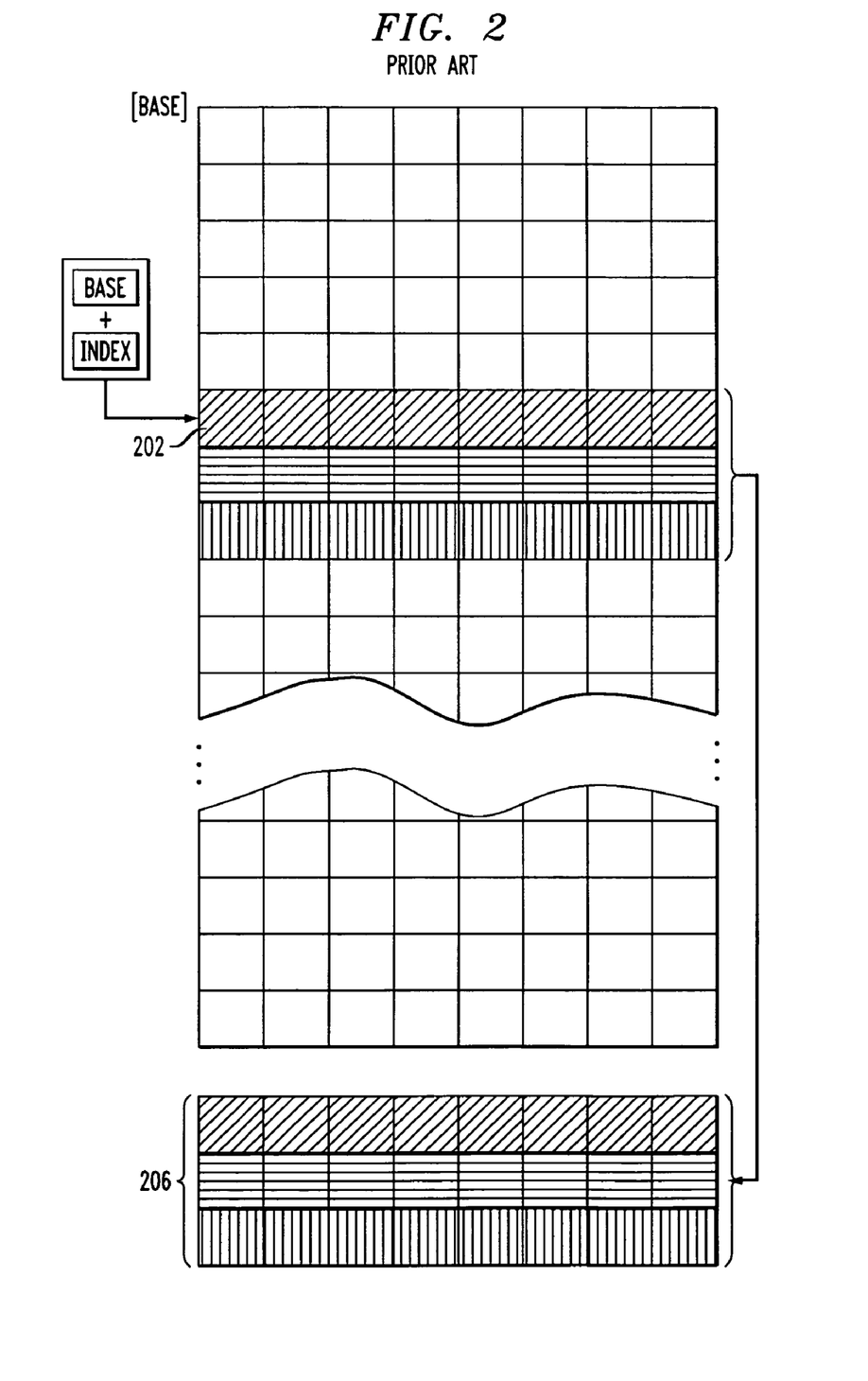
FIG. 2 illustrates the prior art base plus index block memory addressing.

Another known technique for accessing memory, as illustrated in FIG. 2, is a block access. In accordance with this technique, rather than accessing a single data word from the memory unit, a contiguous block of data is read starting at the memory location identified using base-index addressing as described above. With reference to FIG. 2, assume that the base plus index calculation (a=b+x) results in an identification of memory address 202. Rather than accessing the 64 bit data word starting at address 202, the block access technique will access a contiguous block of data starting at location 202. The amount of data that will be accessed depends on the particular implementation. For purposes of illustrations, assume that the block access returns three 64 bit data words. As shown in FIG. 2, the block memory access will return the three 64 bit data words starting at memory location 202. Assuming a read operation, the resulting data will be stored either in a register or another memory location, illustrated in FIG. 2 as 206.

One well known type of memory access is a table lookup, in which data to be accessed is stored in memory as a logical table. The table data structure is particularly well suited for base-index addressing, in which the base address represents the starting location of the table and the index represents the particular entry in the table. Table lookups are often used to implement data transformations in cryptographic algorithms in order to save computation time. Rather than calculate such data transformations in real-time, the data transformations are calculated in advance and the results are stored in a memory table. When a transformation is needed, a table lookup is performed and the result is retrieved from the table. While these table lookups substantially improve the efficiency of cryptographic algorithms, the table lookups remain one of the more time consuming tasks. When many data transformations are necessary, there are a large number of table lookups.

One known technique for simplifying multiple table lookups is the use of a technique in which a memory register (e.g., 64 bits) is considered as containing a number of segments each representing table indices. For example, the memory word may be considered as containing eight 8-bit segments each representing a table index. Each segment is considered as a memory index and is added to a base address to identify a memory location. Each memory address is accessed (e.g., read) and the data at each of the accessed memory addresses is then stored, either in a register or in main memory. It is noted that while this technique may be implemented using one processor instruction, each memory access is performed sequentially, with one memory access at a time. Thus, in the illustrative case in which a 64 bit memory word is considered as containing eight 8 bit segments, there would be eight sequential memory accesses.

Table lookups are an important technique in various computer processing tasks. However, main memory table lookups are expensive in terms of processing time and represent a significant amount of processing time for those algorithms (e.g., cryptographic algorithms) which require a large number of table lookups.

BRIEF SUMMARY OF THE INVENTION

The present invention provides an improved method and apparatus for accessing memory, and is especially useful in applications which require a large number of table lookups in memory.

In accordance with one embodiment of the invention, multiple memory locations are accessed concurrently using the values stored in an index vector to identify the memory locations to be accessed. The index vector contains a plurality of segments, individual ones of which contains a value. Individual ones of a plurality of operator circuits which are coupled to the index vector concurrently perform an operation on individual ones of the index vector values and a base value to generate a plurality of memory addresses. The operation may be, for example, the addition operation or bit substitution. The operator circuits are coupled to one or more memory units and the memory addresses output from the operator circuits are concurrently accessed in the memory units.

In one advantageous embodiment, the memory units store identical data tables such that multiple table lookups may be performed concurrently using the values in the index vector as indices into the data tables. This embodiment is particularly useful in conjunction with table lookup intensive algorithms, such as cryptographic algorithms which make use of data table lookups to perform data transformations.

In another embodiment of the invention, the memory access apparatus is programmable such that it may operate as a vector indexed memory unit or as a conventionally addressed memory unit. In such an embodiment, individual ones of a plurality of operator circuits which are coupled to segments of the index vector concurrently perform an operation on individual ones of the index vector values and a base value to generate a plurality of memory addresses. At the same time, an adder adds the base value to the value represented by the concatenation of all segments of the index vector to generate a single memory address. Using a plurality of multiplexers controlled by a mode select signal, either the plurality of memory addresses, or the single memory address, is provided to the memory units. In this manner, the apparatus may be used as either a vector indexed memory unit or as a conventionally addressed memory unit, and the mode of operation is programmably controlled.

These and other advantages of the invention will be apparent to those of ordinary skill in the art by reference to the following detailed description and the accompanying drawings.

DETAILED DESCRIPTION

Figure 3:
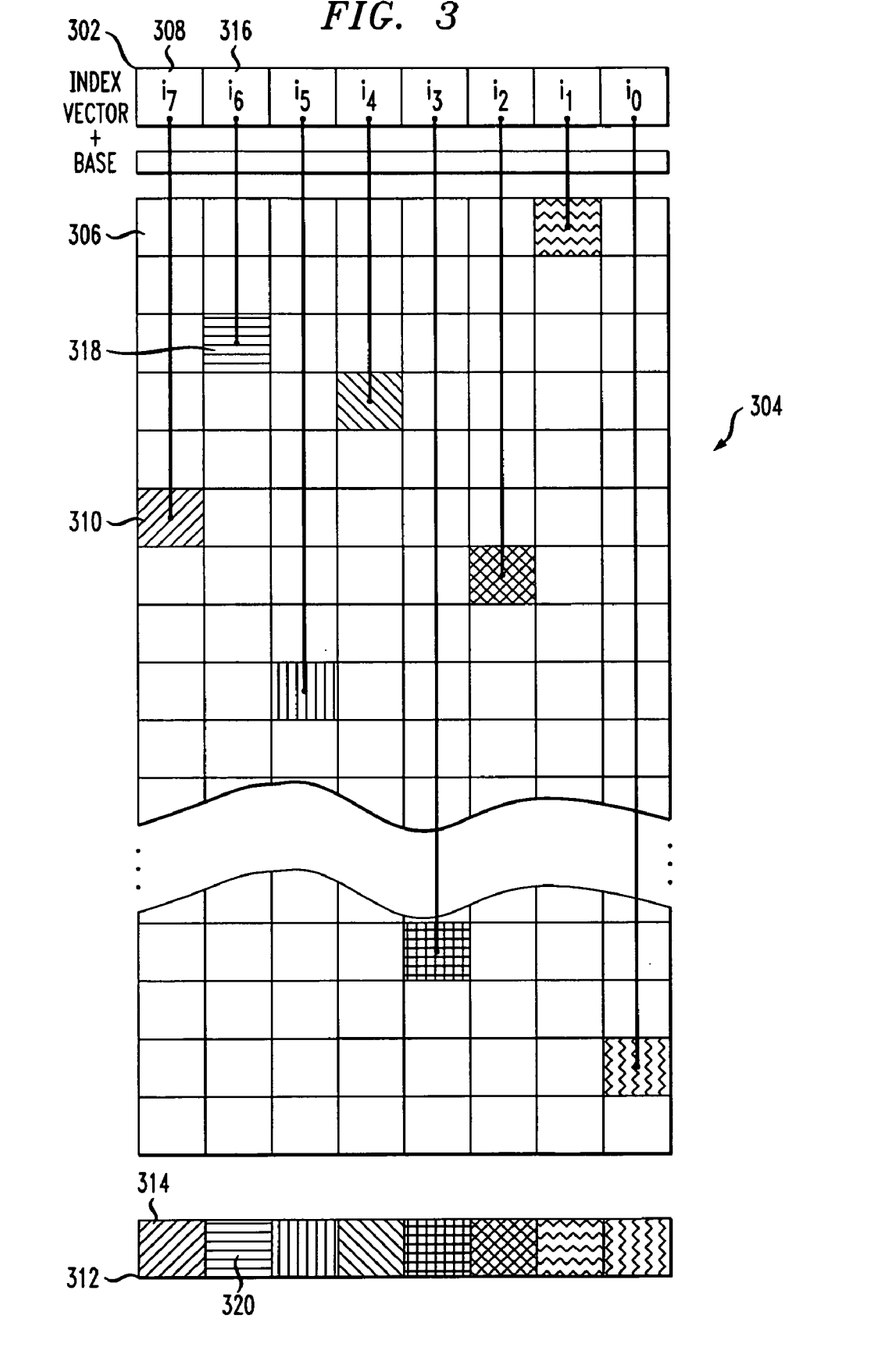
FIG. 3 illustrates vector index memory addressing in accordance with the principles of the present invention.

While details of various embodiments of the invention will be described below, we will first provide a high level description of the principles of the present invention in conjunction with FIG. 3. FIG. 3 shows a logical memory 304 and an index vector 302. For purposes of this discussion, the particular size or layout of the logical memory 304 or of the index vector 302 is unimportant. The logical memory 304 contains various memory locations for storing data. As described above, the logical memory 304 is accessed using base plus index addressing. As such, the base value contains the memory address of the first memory location 306. In accordance with the principles of the present invention, the index vector contains a plurality of values which are used as indices to access memory unit 304. Thus, each of the index vector 302 values is used as an offset from the base value and thus represents a location in memory unit 304. In accordance with one aspect of the invention, the memory locations identified by the indices in the index vector 302 are accessed concurrently and the resulting data is stored in results register 312. As shown in FIG. 3, the index $i_7$ stored in segment 308 of index vector 302 identifies memory location 310 (i.e., $i_7$+Base=memory location 310). Thus, in the case of a read operation, the contents of memory location 310 are retrieved and stored in result register 312 location 314. Similarly, the index stored in segment 316 of index vector 302 identifies memory location 318 and the contents of memory location 318 are retrieved and stored in result register 312 location 320. In this manner, each of the memory locations within memory unit 304 identified by the indices in index vector 302 are accessed and stored in the result register 312. In accordance with one aspect of the present invention, the memory accesses occur concurrently, rather than sequentially as in the prior art. In the example of FIG. 3, eight data items are retrieved from eight different memory locations during one memory access cycle. Using prior art techniques, the retrieval of the same eight data items from the eight different memory locations would require eight memory access cycles. Thus, the present invention provides for multiple memory accesses (e.g., multiple table lookups) in memory access cycle and is especially useful for memory intensive computing algorithms.

Figure 4:
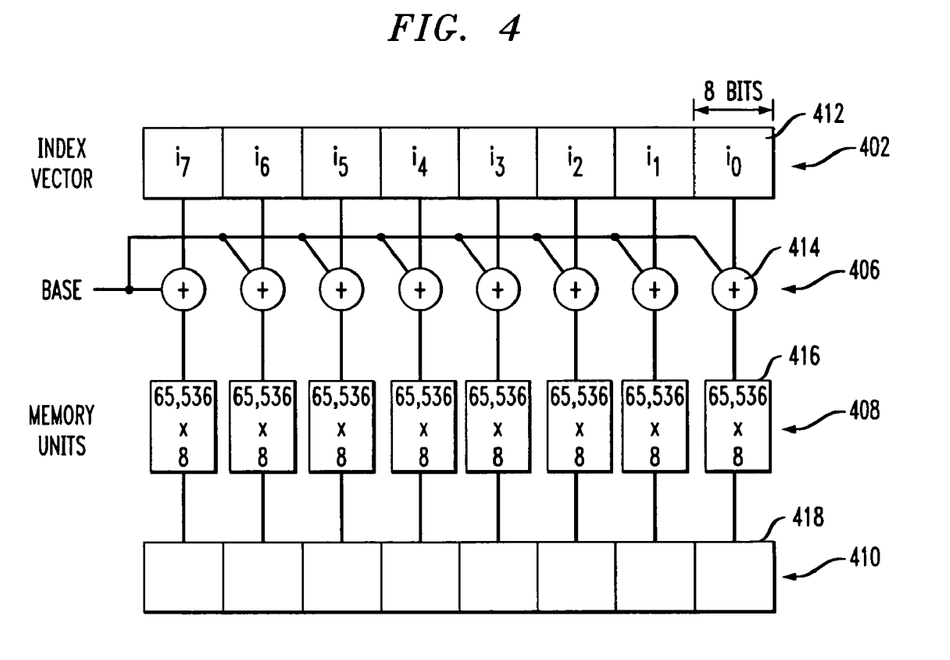
FIG. 4 is a block diagram of an embodiment of a vector indexed memory apparatus.

A block diagram of a first embodiment of the present invention is shown in FIG. 4. One skilled in the art will recognize that FIG. 4 is a high level functional block diagram. As such, and for clarity of description, certain well known required elements are not shown but would be readily apparent to one skilled in the art when implementing the present invention. FIG. 4 shows an index vector register 402 which stores a plurality of table indices in a plurality of segments. In the embodiment shown in FIG. 4, the index vector register is 64 bits wide, with each segment (e.g., segment 412) containing 8 bits. Thus, using base plus index addressing, each segment of the index vector register may address one of 256 memory locations. Each of the index vector register segments is connected to one of a plurality of adders 406. Each of the adders has as one input a base value (stored, for example, in a memory register) for use in the base plus indexing addressing technique, and as its other input an associated one of the segments of the index vector register. Thus, for example, adder 414 has as one of its inputs the base value and as its other input segment 412 of the index vector register 402. The output of the adders 406 are connected to associated memory units 408. Thus, for example, the output of adder 414 is connected to memory unit 416. It is the output of adder 416 that is used to access the memory unit 416. In the embodiment shown in FIG. 4, the memory units 408 are each 8 bits wide and contain 65,536 8-bit data words. This is appropriate assuming a base value having 16 bits. The output of the memory units 416 are connected to associated segments of a result register 410. Thus, for example, the output of memory unit 416 is connected to segment 418 of result register 410. Assuming a read operation, the data read from the memory units 408 are stored in appropriate segments of the result register 410.

We will now describe the operation of the apparatus shown in FIG. 4 by describing the memory access with respect to one of the indices in the index vector register 402. As shown in the figure, segment 412 of index vector register 402 contains the index $i_0$. Adder 414 adds index $i_0$ with the base value and provides the resulting address to memory 416. The base value represents the first address of a table stored in memory 416 and the index $i_0$ is the index into the table. Assuming the memory access in this case was a read operation, the data stored at the memory location output by adder 414 is stored in segment 418 of result register 410. The above described memory access is concurrently carried out for each of the indices stored in the segments of index vector register 402. As such, in a single memory access cycle, the result register 410 is loaded with the values identified by the indices stored in the index vector register 402.

The memory units 408 of FIG. 4 may be implemented in various ways. For example, each of the memory units may be a separate physical memory unit. Alternatively, the various memory units shown in FIG. 4 may be implemented using one or more multiport memory units which are well known in the art. In a multiport memory embodiment, the outputs of the adders 406 would be connected to individual ports of the multiport memory.

In certain embodiments, the data stored in each of the memory units 408 will be identical. For example, consider an implementation of the present invention which will be used to optimize a particular algorithm in which many table lookups are required in a data table which has 256 8-bit entries. In such an embodiment, each of the memory units 408 could be stored with the same data table, and in accordance with the embodiment shown in FIG. 4, 8 table lookups could be performed simultaneously by storing 8 indices in the index vector 402. In accordance with this embodiment of the invention, the 8 table items associated with the 8 indices will be concurrently loaded into the result register 410 as described above. Of course, in various other embodiments, the memory units 408 may store different data, or some memory units may store the same data while other memory units store different data.

Figure 5A:
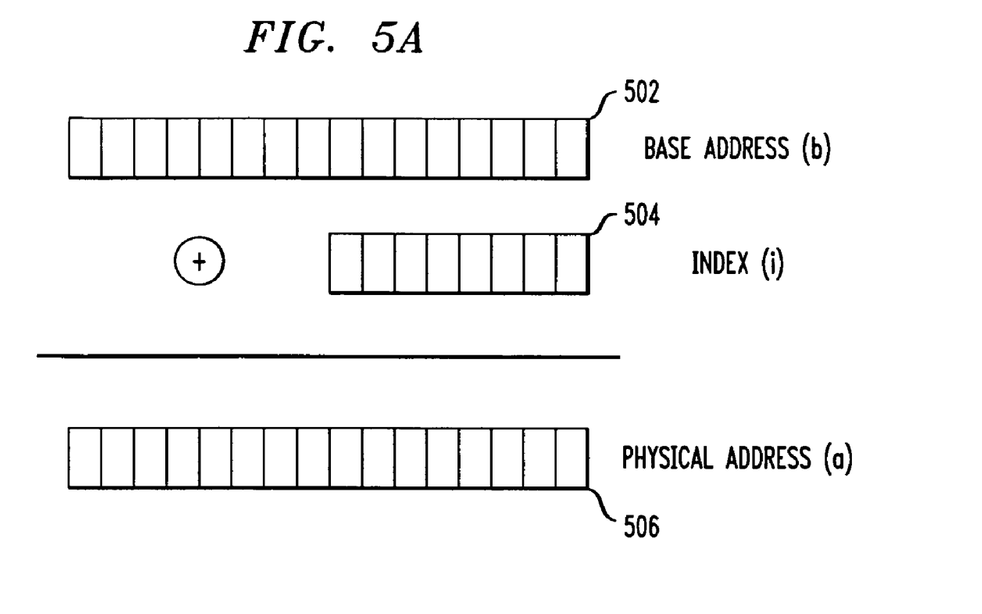
FIG. 5A illustrates the binary addition operation in conjunction with base plus index memory addressing.
Figure 5B:
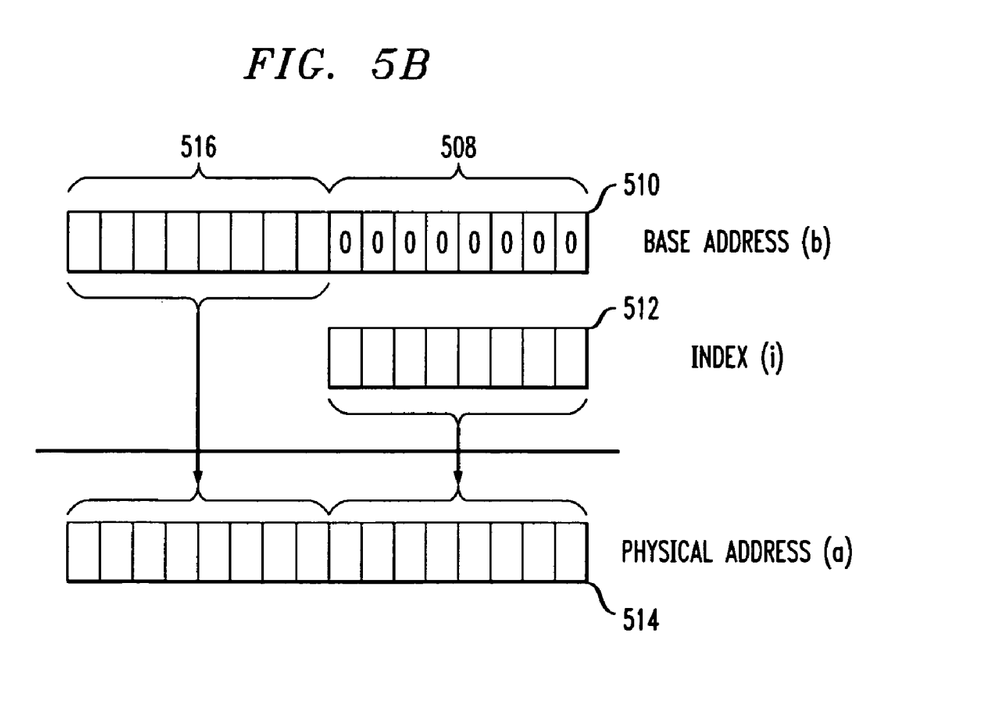
FIG. 5B illustrates bit slicing which may be used in accordance with one embodiment of the present invention.

In another embodiment of the invention, the adders 414 of FIG. 4 are replaced with bit replacement operators to further improve the speed of operation. Prior to describing this embodiment, we will first describe in further detail the addition operation performed by the adders in FIG. 4. FIG. 5A shows the addition operation performed by the adders 406. As described above, the embodiments described herein utilize the base plus index addressing technique wherein the physical memory address a is calculated by adding an index value i to a base value b such that a=b+x. Assume for purposes of discussion a base address of 16 bits, an index address of 8 bits and a physical address of 16 bits. Thus, as shown in FIG. 5A, the base address 502 is added to the index 504 to obtain the physical address 506. This addition operation of FIG. 5A is a standard binary addition which is well known in the art. While not an overly complex operation, memory access in accordance with the present invention may be further improved by replacing the addition operator with a bit replacement operator. Referring now to FIG. 5B, if we assume that the low order bits 508 of the base address 510 are all 0 (or unused), then the index address 512 can be effectively added to the base address 510 by merely replacing the low order bits 508 of the base address 510 with the bits of the index address 512 to obtain the physical address 514. This bit replacement could be implemented in various ways. For example, in one embodiment, the high order bits 516 of the base address 510 could be concatenated with the bits of the index address 512. One of ordinary skill in the art of binary logic would understand that the bit replacement operation may also be implemented using a logical OR operation so long as the assumption holds that the low order bits 508 of the base address 510 are all 0.

One skilled in the art would recognize that the use of bit replacement as described in conjunction with FIG. 5B requires certain assumptions to be met and the data in the memory units to be organized in a particular manner. For example, in the embodiment described in conjunction with FIG. 5B, it is assumed that the low order 8 bits 508 of the 16 bit base address 510 are all zero or unused. This means that any tables stored in the memory units must begin on 256 byte page boundaries.

Thus, in an alternate embodiments, the adders 406 of FIG. 4 would be replaced with bit replacement operators (e.g., logical OR operators or an operator which performs concatenation of appropriate bits).

Figure 6:
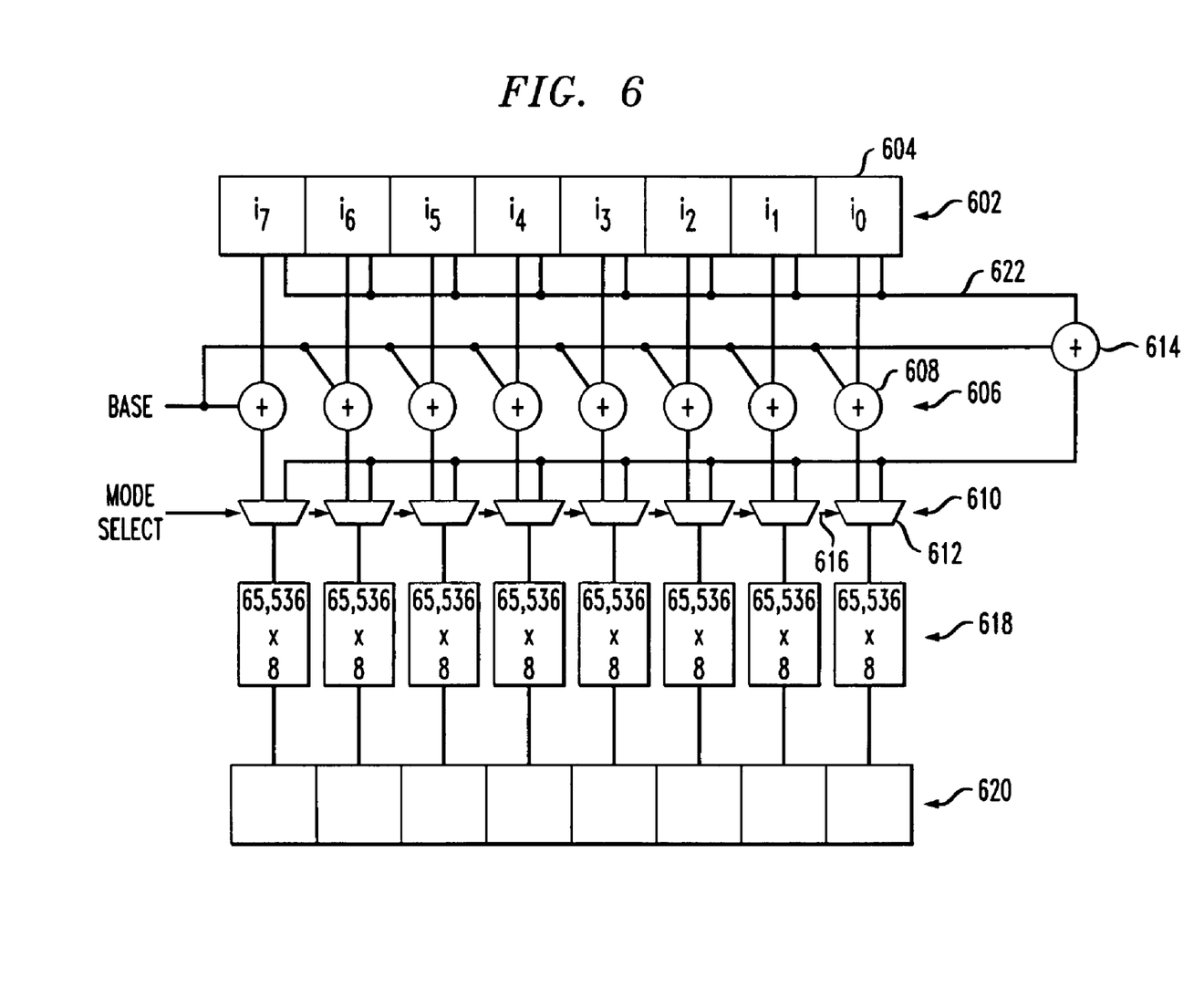
FIG. 6 is a block diagram of an embodiment of a memory apparatus which is programmable to operate in a vector indexed memory mode or conventional memory addressing mode.

Another embodiment of the invention is shown in FIG. 6. In this embodiment, the apparatus is programmable to act as either a vector indexed memory or as a convention memory. FIG. 6 shows an index vector register 602 which stores either a plurality of table indices in a plurality of segments in the manner described above in conjunction with FIG. 4, or a single index as described in further detail below. In the embodiment shown in FIG. 6, we will again assume that the index vector register is 64 bits wide, with each segment (e.g., segment 604) containing 8 bits. Thus, using base plus index addressing, each segment of the index vector register may address one of 256 memory locations. Each of the index vector register segments is connected to one of a plurality of adders 606. Each of the adders has as one input a base value for use in the base plus indexing addressing technique, and as its other input an associated one of the segments of the index vector register 602. Thus, for example, adder 608 has as one of its inputs the base value and as its other input segment 604 of the index vector register 602.

The apparatus shown in FIG. 6 also contains adder 614 which has as one input the base value. The other input of adder 614 is the 64-bits of the index vector register 602. However, unlike the adders 606 which each have as an input a particular segment of the index vector register 602, adder 614 has as an input the entire index vector register 602. Thus, the adder 614 receives all 64-bits of the index vector register 602 via 64-bit line 622. Another way to view this input of the adder 614 is that the adder receives the concatenated bits of the individual segments of the index vector register 602. In operation, the adder 614 adds the single value represented by the 64-bits of the index vector register 602 and the value represented by the 16 bits of the base value to produce a single memory address as its output.

The outputs of each of the adders 606 are each provided as an input to an associated one of the multiplexers 610 as shown in FIG. 6. The output of adder 614 is also provided as an input to each of the multiplexers 610. Each of the multiplexers also has as an input a mode select signal which determines which of the multiplexer inputs is output from the multiplexer. Thus, for example, multiplexer 612 has as one input the output of adder 608 and as another input the output of adder 614. The mode select signal 616 to multiplexer 612 will determine which of its two inputs is output from the multiplexer. The output of each for the multiplexers 610 is an input to an associated one of the memory units 618. The output of the memory units 618 are connected to associated segments of a result register 620.

We will now describe the operation of the apparatus shown in FIG. 6. As shown in the figure, segment 604 of index vector register 602 contains the index $i_0$. Adder 608 adds index $i_0$ with the base value and provides the resulting address to multiplexer 612. Each of the adders 606 operates in a similar manner concurrently adding one of the indices in one of the segments of the index vector register 602 with the base value and provides the result to an associated one of the multiplexers. At the same time, the adder 614 adds the entire index vector register 602 to the base value. That is, the adder 614 concatenates the bits in all of the segments and adds the value represented by the concatenated bits to the base value. Thus, the adder 614 performs the operation: base value+$i_7$ $i_6$ $i_5$ $i_4$ $i_3$ $i_2$ $i_1$ $i_0$. The output of the adder 614 is provided to each of the multiplexers 610. The operation of the memory units 618 and result register 620 are as described above in connection with FIG. 4.

The mode select signal, which is an input to each of the multiplexers 610, determines which of the multiplexer inputs is output from the multiplexer. For example, the presence of a 0 on the mode select signal could indicate that the multiplexer will pass the output of adders 606 as an output, while the presence of a 1 on the mode select signal could indicate that the multiplexer will pass the output of adder 614 as an output. The mode select signal is programmable, and thus determines whether the apparatus will operate in a standard memory addressing mode or in a vector indexed addressing mode. If the mode select signal is 0, then the multiplexers pass the output of adders 606 as an output and thus the apparatus operates in a vector indexed addressing mode as described above in connection with FIG. 4. If the mode select signal is 1, then the multiplexers pass the output of adder 614 as an output and thus the apparatus operates in a standard memory addressing mode. In this standard memory addressing mode, the vector index register 602 contains a single index which is used as an offset from the base value in order to address the memory units 618. Each of the memory units 618 is addressed using the same base plus index value. In this standard mode, although the memory units 618 may be separate logical memories, they will appear as a single memory during the standard memory addressing mode of operation. Assuming a read operation in the standard addressing mode, an 8-bit value will be read from each memory unit 618 and stored in an associated segment of the result register 620. At the end of the operation, the result register 620 will contain a 64-bit value which, to the user, represents the single value returned as a result of the conventional memory access.

In vector indexed memory mode, the index vector register 602 stores a vector of multiple values which are used as indices for memory access. However, in the standard memory access mode, the value stored in the index vector register 602 is not a vector of values, but a single value stored in the entire concatenated 64-bits. We note here that we identify the register 602 as a vector indexed register in both modes for clarity of description, even though in standard mode the register does not store a vector of index values. This is pointed out to make clear that in the embodiment shown in FIG. 6, the register 602 may store either a vector of values or a single value, and the use of the term vector indexed register to identify this register should not be taken to limit the contents of the register to a vector of values.

In an alternate embodiment, the adders 606 of FIG. 6 may be replaced with bit replacement operators (e.g., logical OR operators or concatenation operators) in order to implement the bit replacement embodiment as described above.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the embodiments described above show various components having particular size (e.g., number of bits in a data word, number or memory units, or memory size), but it is to be understood that these are particular embodiments only, and the invention may be implemented using various components having different configurations. One skilled in the art would readily recognize that the principles of the present invention may be implemented using components of various sizes and configurations. Also, the embodiments described herein have for the most part been described using the read operation as an example of a memory access. However, the memory access techniques of the present invention are not limited to read operations. The principles of the present invention also apply to accessing memory for write operations.

The invention claimed is:

1. A method for accessing at least one memory unit, wherein when the memory unit is based on an index vector comprising a plurality of values, said method comprising the steps of:
   concurrently performing an operation on individual ones of said plurality of index vector values stored in a single storage register with a same base value to concurrently generate a plurality of memory addresses; and
   concurrently accessing more than two of said plurality of memory addresses in said at least one memory unit, and
   wherein when the memory unit is not based on an index vector, the single storage register is configured to concatenate the plurality of index vector values into a single memory address.

2. The method of claim 1 wherein said operation is addition.

3. The method of claim 1 wherein said operation is bit replacement.

4. The method of claim 3 wherein said bit replacement operation is implemented with logical OR and a plurality of least significant bits of said base address are 0.

5. The method of claim 3 wherein said bit replacement operation is implemented with bit concatenation.

6. The method of claim 1 wherein said at least one memory unit comprises one multiport memory unit and wherein said step of concurrently accessing comprises the step of accessing individual ones of said plurality of memory addresses via one corresponding memory port.

7. The method of claim 1 wherein said at least one memory unit comprises a plurality of memory units and wherein said step of concurrently accessing comprises the step of accessing individual ones of said plurality of memory addresses in one corresponding memory unit.

8. The method of claim 1 wherein said step of concurrently accessing further comprises the steps of:
   concurrently reading data from individual ones of said plurality of memory addresses; and
   storing said data in a storage register.

9. The method of claim 1 wherein said step of concurrently accessing further comprises the step of concurrently writing data to individual ones of said plurality of memory addresses.

10. Apparatus comprising:
    a first storage register for storing an index vector comprising a plurality of values;
    a second storage register for storing a base value;
    a plurality of operator circuits, individual ones of said plurality of operator circuits having a first input coupled to at least a portion of said first storage register and a second input coupled to said second storage register, said plurality of operator circuits for performing an operation on individual ones of said index vector values with said base value to concurrently generate a plurality of memory addresses on outputs of said operator circuits; and
    at least one memory unit coupled to the outputs of said operator circuits such that more than two of said plurality of memory addresses are concurrently accessible in said at least one memory unit, and wherein when the memory unit is not based on an index vector, the plurality of values are concatenated into a single value.

11. The apparatus of claim 10 wherein said operator circuits are adders.

12. The apparatus of claim 10 wherein said operator circuits are bit replacement circuits.

13. The apparatus of claim 12 wherein said bit replacement circuits are logical OR circuits and a plurality of least significant bits of said base address are 0.

14. The apparatus of claim 12 wherein said bit replacement circuits are bit concatenation circuits.

15. The apparatus of claim 10 wherein said at least one memory unit is a multiport memory unit and wherein individual ones of said ports of said multiport memory unit are coupled to an output port of a corresponding operator circuit.

16. The apparatus of claim 10 wherein said at least one memory unit comprises a plurality of memory units and wherein individual ones of said plurality of memory units is coupled to an output of a corresponding operator circuit.

* * * * *